United States Patent
Al-Rashid et al.

(10) Patent No.: US 11,722,491 B1
(45) Date of Patent: Aug. 8, 2023

(54) CUMULATIVE RISK-BASED SCORING FOR QUORUM AUTHORIZATION

(71) Applicant: Amazon Technologies, Inc., Seattle, WA (US)

(72) Inventors: Kazi Naim Al-Rashid, Redmond, WA (US); Dean H Saxe, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 245 days.

(21) Appl. No.: 16/917,840

(22) Filed: Jun. 30, 2020

(51) Int. Cl.
*H04L 29/00* (2006.01)
*H04L 9/40* (2022.01)

(52) U.S. Cl.
CPC ........... *H04L 63/101* (2013.01); *H04L 63/102* (2013.01); *H04L 63/0869* (2013.01); *H04L 63/1433* (2013.01)

(58) Field of Classification Search
CPC ... H04L 63/101; H04L 63/0869; H04L 63/102; H04L 63/1433
See application file for complete search history.

(56) References Cited

U.S. PATENT DOCUMENTS

| | | | |
|---|---|---|---|
| 8,014,756 B1 | 9/2011 | Henderson | |
| 9,077,758 B1 | 7/2015 | McGovern et al. | |
| 9,300,639 B1* | 3/2016 | Roth et al. | H04L 63/0428 |
| 9,386,033 B1* | 7/2016 | Rossman | H04L 41/0893 |
| 9,712,535 B1* | 7/2017 | Rossman | H04L 63/10 |
| 9,967,285 B1* | 5/2018 | Rossman et al. | G06F 16/22 |
| 10,038,700 B1* | 7/2018 | Duchin | H04L 67/12 |
| 10,050,999 B1* | 8/2018 | Rossman | H04L 63/1416 |
| 10,291,622 B1* | 5/2019 | Rossman et al. | H04L 63/102 |
| 10,296,750 B1* | 5/2019 | Rossman | G04F 16/2365 |
| 10,367,834 B2* | 7/2019 | Sweet et al. | H04L 63/0853 |
| 10,476,847 B1* | 11/2019 | Smith et al. | H04L 63/0407 |
| 10,523,716 B1 | 12/2019 | Stickle et al. | |
| 10,601,816 B1 | 3/2020 | Stickle et al. | |
| 10,678,658 B2* | 6/2020 | Tomlinson et al. | G06F 21/40 |
| 10,951,606 B1* | 3/2021 | Shahidzadeh et al. | H04W 4/14 |
| 11,100,489 B2* | 8/2021 | Lee et al. | G06Q 20/4014 |
| 11,159,309 B2* | 10/2021 | Seyfried et al. | H04L 9/0894 |
| 11,200,310 B2* | 12/2021 | Shafet et al. | G06F 16/3347 |
| 11,206,258 B2* | 12/2021 | Ericson | H04L 63/0853 |

(Continued)

OTHER PUBLICATIONS

U.S. Appl. No. 17/039,864, Filed Sep. 30, 2020, Dean H. Saxe et al.

*Primary Examiner* — Don G Zhao
(74) *Attorney, Agent, or Firm* — S. Scott Foster; Kowert, Hood, Munyon, Rankin & Goetzel, P.C.

(57) ABSTRACT

Cumulative risk-based scoring may be implemented for quorum controls. Requests for authorization of a proposed action may be received. Approvals from members of a quorum set authorized to approve the action may be received. Risk assessments of the members may be used to generate authorization scores. The combined authorization scores may be compared with a quorum authorization threshold to determine whether the proposed action is authorized or denied.

20 Claims, 9 Drawing Sheets

(56) References Cited

U.S. PATENT DOCUMENTS

| | | | |
|---|---|---|---|
| 11,240,030 B2* | 2/2022 | Sarin | H04L 63/08 |
| 11,270,311 B1* | 3/2022 | Jass | G06Q 20/4016 |
| 2005/0114650 A1* | 5/2005 | Rockwood et al. | H04L 63/08 |
| | | | 713/155 |
| 2008/0243933 A1* | 10/2008 | Holtzman et al. | G06Q 10/10 |
| 2014/0280955 A1* | 9/2014 | Stuntebeck et al. | H04L 63/20 |
| | | | 709/226 |
| 2016/0380989 A1* | 12/2016 | Bailey et al. | H04W 12/06 |
| | | | 726/5 |
| 2017/0076518 A1 | 3/2017 | Patterson et al. | |
| 2017/0093863 A1* | 3/2017 | Galtsev et al. | H04L 63/20 |
| 2017/0093904 A1* | 3/2017 | Ng et al. | H04L 63/20 |
| 2019/0236297 A1 | 8/2019 | Efendiyev, Jr. et al. | |
| 2019/0268342 A1* | 8/2019 | Rossman et al. | G06F 21/40 |
| 2019/0394175 A1* | 12/2019 | Zhang et al. | H04L 9/3239 |
| 2020/0007314 A1* | 1/2020 | Vouk et al. | H04L 9/0637 |
| 2020/0204357 A1* | 6/2020 | Seyfried et al. | H04L 9/3215 |
| 2020/0401325 A1* | 12/2020 | Lamba et al. | G06F 21/40 |
| 2021/0110047 A1* | 4/2021 | Fang | G06N 20/00 |
| 2021/0173897 A1* | 6/2021 | Jakobsson | G06F 21/121 |
| 2021/0203657 A1* | 7/2021 | Huapaya et al. | H04L 63/0884 |
| 2021/0304206 A1* | 9/2021 | Juneja et al. | G06Q 20/206 |
| 2021/0304316 A1* | 9/2021 | Leddy, III et al. | G06F 21/32 |
| 2021/0352097 A1* | 11/2021 | Vlahovic et al. | H04L 63/0884 |

\* cited by examiner

CUMULATIVE RISK-BASED SCORING FOR QUORUM AUTHORIZATION

BACKGROUND

A cloud provider, or other provider network, may implement multiple network-based services. These services may provide different functionality, such as computational resources, storage resources, data transmission, among various others. Authorization techniques to coordinate the identity and privileges of different users to obtain, use or otherwise manage resources from the network-based services may be implemented to obtain authorization to use managed resources on behalf of users.

Figure 1:
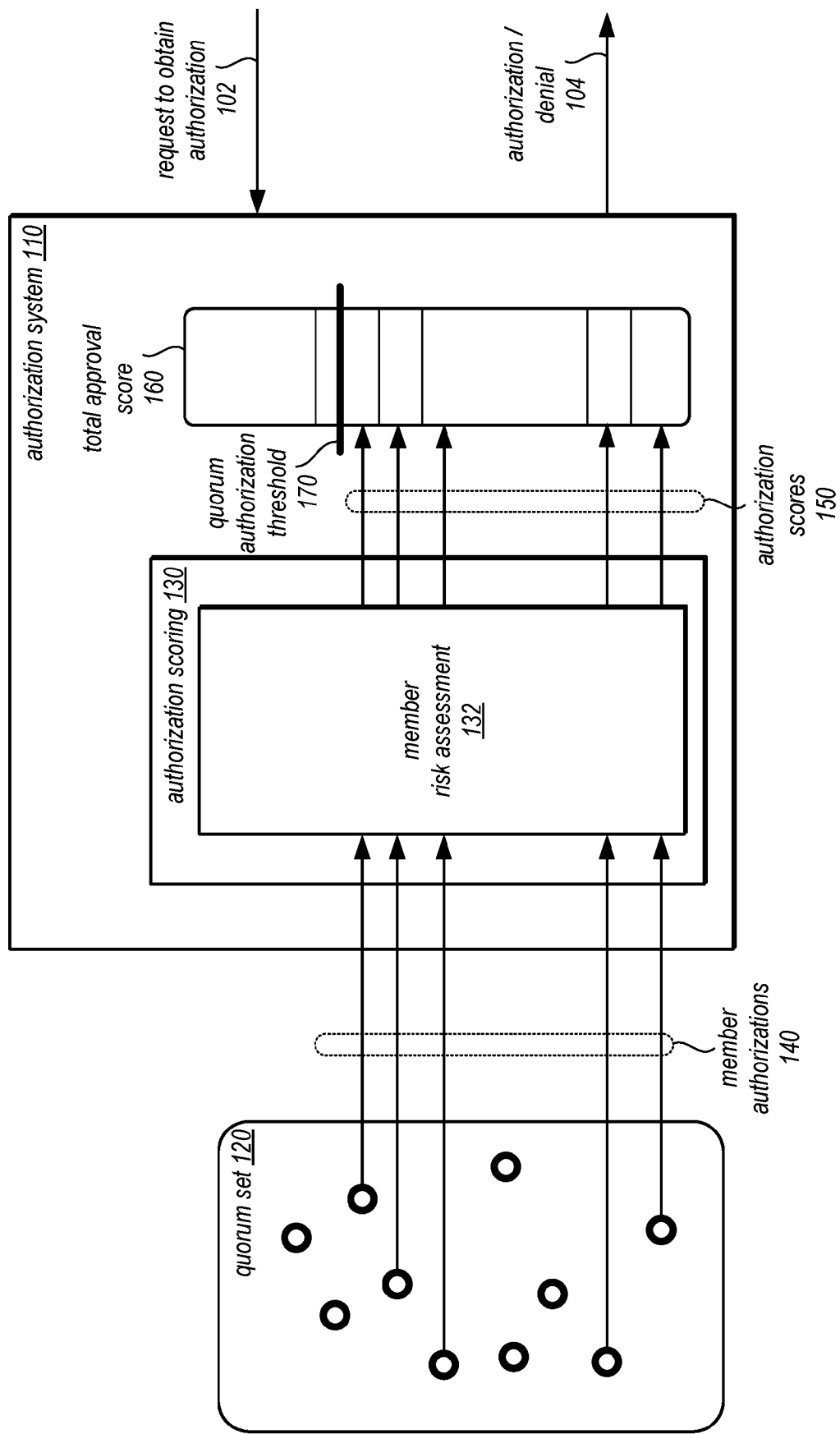
FIG. 1 illustrates a logical block diagram of cumulative risk-based scoring for quorum authorization, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for cumulative risk-based scoring for quorum authorization are described herein. Authorization systems may support permissions and other controls (e.g., access controls) for performing different operations. Large scale networks implementing multiple different services, as well as individual systems, may utilize authorization systems to ensure that actions taken or directed by different actors within the services or system can be reliably performed with authorization, in various embodiments. For example, an authorization system may be used to verify or otherwise determine authorization to modify the way an access control system is applied to users, in various embodiments (e.g., as a policy validation point for another system or service that implements a policy enforcement point). In another example, an authorization system may be used to verify data movement, feature or code deployment, or other operations that the client systems of the authorization system may then perform once authorization is obtained (or not perform if denied), in some embodiments.

As the complexity of systems protected by authorization systems grows and the scale and speed at which access control problems need to be managed increases, techniques that provide secure and fast authorization for proposed actions are highly desirable. For example, online, quorum-based authorization as m of n systems may be implemented where m actors from a pool of n actors must approve an action before the action is authorized and executed by the system (where m and n are both non-zero positive numbers and m<n). As such quorum-based approval systems are static and do not include provisions for risk assessment of the actors, malicious actors may be able to game the system in their favor. However, risk-based scoring for quorum authorization techniques described herein may be implemented where the size of the quorum (m) is no longer fixed. Instead, the quorum members (n) may be independently assigned an authorization score (r) based on risk (e.g., with values between 0 (high risk) and 1 (low risk)). In this way, authorization scores can utilize various factors to determine risk and thus the authorization score, which may include but are not limited to, account age, authentication mechanism (e.g. password vs. strong authentication with multi factor authentication), account history (e.g. past account actions), among various other factors. For each authorization decision, a quorum may be achieved when the total (e.g., sum of individual authorization scores) authorization score ($\Sigma$) satisfies a quorum authorization threshold (e.g., where $\Sigma$ is greater than a minimum value configured for the quorum operation). The number of approvers in a quorum set can change, allowing the quorum approval requirements to adapt as risk levels change, in some embodiments. In addition to risk-based authorization scores, other quorum policy criteria may be applied, such as an example additional criteria that at least m of n vote to authorize, ensuring that a minimum number of quorum members approve of the quorum and $\Sigma$ is greater than the defined minima, in some embodiments.

FIG. 1 illustrates a logical block diagram of cumulative risk-based scoring for quorum authorization, according to some embodiments. Authorization system 110 may authorize operations for one (or multiple) systems or services, including public services offered by a provider network, like those discussed below with regard to FIG. 2, or standalone or private systems. Authorization system 110 may be implemented across one (or multiple) computing systems or devices, like computing system 1000 discussed below with regard to FIG. 9. Authorization system 110 may, for instance, authorize operations to manage access controls for users of accounts, or may identify proposed changes to resource configurations or operations, move data, or perform other actions with respect to protected system resources.

Authorization system 110 may accept requests to obtain authorization 102 via an interface (e.g., interface 212 in FIG. 2), in various embodiments. The request to obtain authorization 102 may identify the resource, unit, operations, and/or other features of the proposed action. In some embodiments, an identifier or other association between the authorization mechanism (e.g., quorum set 120) and the proposed action may be included. In some embodiments, the appropriate quorum set 120 may be identified automatically (e.g., in cases where the same quorum set is applied to all requests or where a mapping or other information specifies which quorum set, such as quorum set 120, is applicable to which proposed action).

Authorization system 110 may provide notifications or other indications of the proposed action to members of quorum set 120. As discussed below with regard to FIG. 3, the members of a quorum set may be identified and/or notified of membership when creating or updating quorum set 120. In some embodiments, all members of quorum set 120 may be authorized, whereas in other embodiments a subset of one or more members may be notified of a proposed action (and may include multiple rounds of notification in order to increase the likelihood of obtaining appropriate approvals). As illustrated in FIG. 1, different members of quorum set 120 may send or otherwise indication authorization 140 to perform the proposed action. These notifications may be provided through a same (e.g., same interface) or different communication path as the notifications, in some embodiments (e.g., console based approval vs. a text or electronic mail notification).

Authorization system 110 may implement authorization scoring 130 to determine respective authorization scores 150 for each of member authorizations 140. Authorization scoring 130 may use member risk assessment 132 in order to determine a risk of malicious, erroneous, or other invalid rational for reducing the weight or other authority for approval responses received from members. For example, in some embodiments different features or factors (as noted above) may be considered for determining a risk assessment, including various behavioral factors associated with a member, role factors associated with a member, and/or various other factors, such as authorization source location, source hardware and/or software, and so on. Different types of risk analysis systems or application, such as heuristics-based systems, rules-based systems, machine learning-based systems, among others, may accept as input the different factors and determine the risk assessment. This risk assessment may be generated as a score, label, or other feature which may be incorporated into (or the entirety of) authorizations cores 150.

Authorization system 110 may determine a total authorization score 160 which may be a combination of authorization scores 150. As noted in FIG. 1, different scores may have different sizes, weights or values, contributing in different ways to total authorization score. In this way, a riskier authorization could account for less of total authorization score 160 allowing for more trustworthy authorizations to control whether authorization is granted. Quorum authorization threshold 170 may be used to evaluate whether total authorization score 160 is enough to grant authorization. In some embodiments, as discussed below with regard to FIGS. 4, 5B, and 7, quorum authorization threshold may change over time. When sufficient member authorizations 140 result in a total authorization score 160 that satisfies quorum authorization threshold 170, authorization system 104 may send an authorization 104 (or denial if not satisfied), in some embodiments.

The previous description of a quorum control for an authorization system 110 in FIG. 1 is a logical illustration and thus is not to be construed as limiting as to the architecture for implementing an authorization system 110.

This specification begins with a general description of a provider network that implements an authorization service for different services across provider network regions. Then various examples of the authorization service including different components/modules, or arrangements of components/module that may be employed as part of implementing the authorization service are discussed. A number of different methods and techniques to implement cumulative risk-based scoring for quorum authorization are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
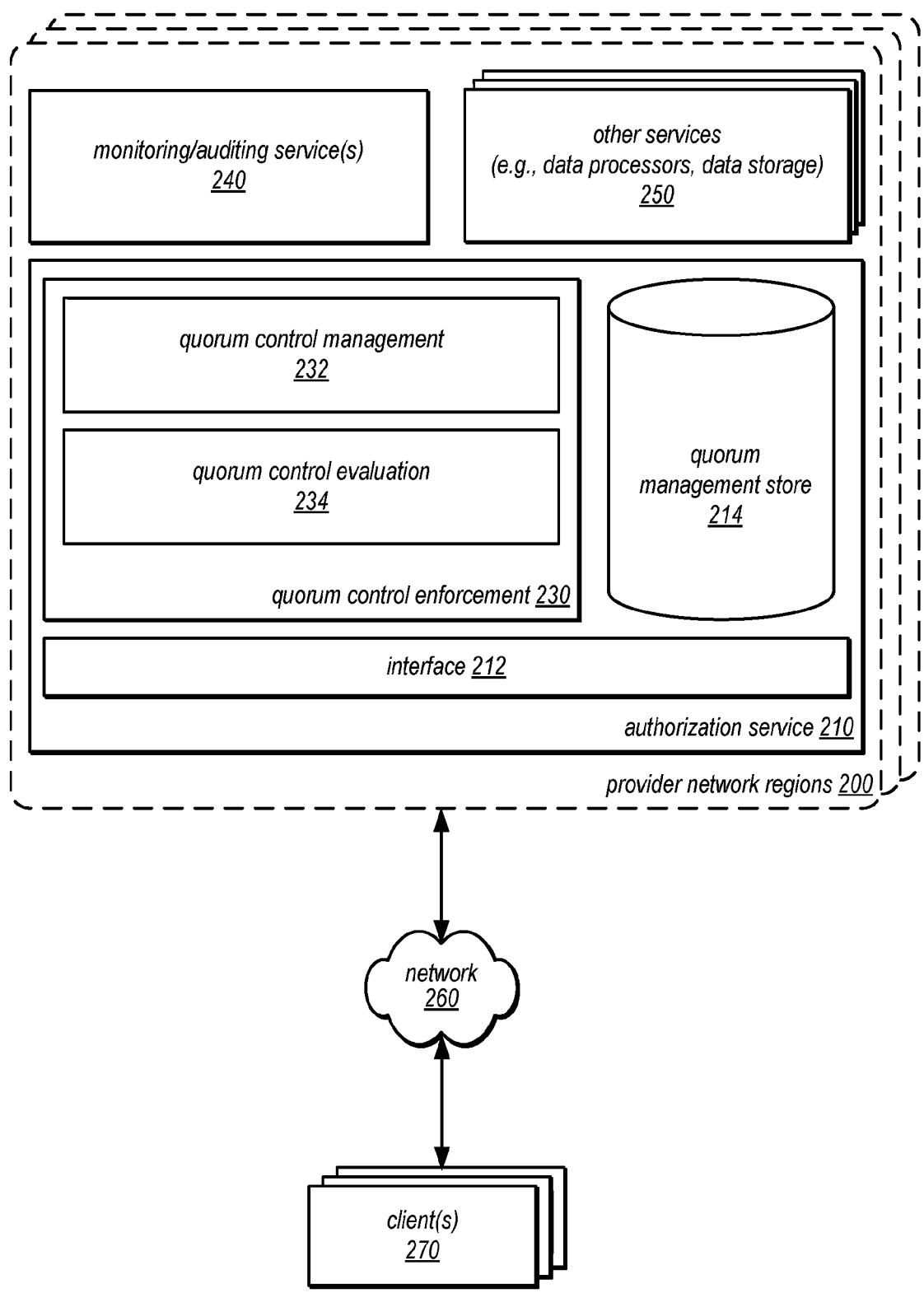
FIG. 2 is a logical block diagram illustrating a provider network implementing an authorization service that implements cumulative risk-based scoring for quorum authorization, according to some embodiments.

FIG. 2 is a logical block diagram illustrating a provider network implementing an authorization service that implements cumulative risk-based scoring for quorum authorization, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions 200, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions 200 may be connected to a global network which includes private networking infrastructure (e.g., fiber connections controlled by the cloud provider) connecting each region to at least one other region. The provider network may deliver content from points of presence outside of, but networked with, these regions 200 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as authorization service 210, auditing/monitoring service(s) 240, and other services 250, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Authorization service 210 may implement cumulative risk-based scoring for quorum authorization, as discussed above with regard to FIG. 1 and below with regard to FIGS. 3 - 7. Authorization service 210 may provide operators of other services 250 and auditing/monitoring service 240, with the ability to determine authorization for various types of actions (e.g., resource, user, or other operations). For example, authorization service 210 can provide fine-grained access controls to different service resources, support different authentication techniques or protocols, such as multi-factor authentication (MFA), support analysis or tools for specifying access controls, and integration features for external or alternative identity and access control mechanisms, in some embodiments. In some embodiments, authorization service 200 may provide for authorization for various types of deployment, source control, or other code/resource management operations.

Authorization service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of various Authorization service 210 features, including quorum controls as discussed below with regard to FIGS. 3 and 4 for obtaining authorization, such as various authorization requests as discussed above with regard to FIG. 1 and below with regard to FIGS. 4, 6, and 7.

Authorization service 210 may implement quorum control enforcement 230, in various embodiments, in order to allow for quorum controls to be created, updated, deleted, and enforced, as discussed below with regard to FIGS. 3 and 4. For example, quorum control enforcement 230 may implement quorum control management 232 to handle creation, update, and delete requests for quorum controls, in some embodiments. In some embodiments, quorum control management may implement quorum control evaluation 234 for determining whether a proposed operation may be granted authorization based on the approval (or denial or non-answer) responses for a proposed action.

In various embodiments, a provider network may implement monitoring service 240. Auditing/monitoring service 240 may provide service event and information logging and monitoring to provide auditing and observability for clients (e.g., customers of services 250), including some of the approval and other quorum control information exchanged as discussed below with regard to FIGS. 3 and 4. For instance, approved and denied proposed actions may be logged by auditing/monitoring service 240 in order to detect events or alarms based on, for instance, number of failed attempts, or may provide insight for recognizing repeated requests for changes that may not satisfy regulatory standards for access controls, in some embodiments.

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to specify quorum controls and/or request operations that cause or trigger requests to obtain authorization, in some embodiments. For example, a given client 270 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
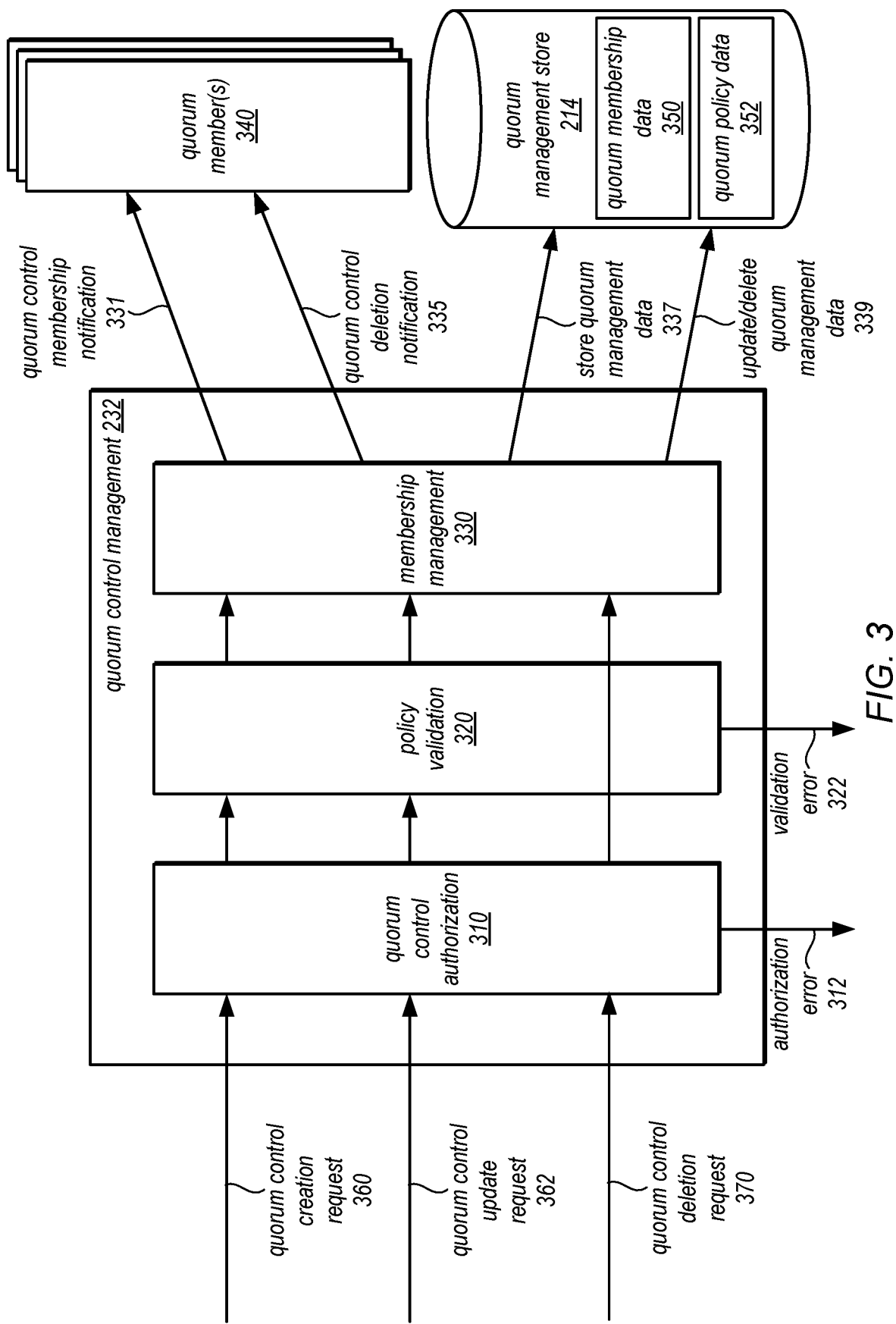
FIG. 3 illustrates example interactions to establish a quorum for an authorization service, according to some embodiments.

FIG. 3 illustrates example interactions to establish a quorum for an authorization service, according to some embodiments. Quorum control creation 232 may handle operations to manage a quorum control, in some embodiments. For example, a quorum control creation request 360 may be received, in some embodiments, via an interface, such as interface 212. The creation request 360 may specify various features of the quorum control such as an identifier for the quorum, identifier of members or types of approvers (roles), approval polic(ies) for operation(s), TTL for obtaining approval, and notification mechanisms for members, in some embodiments. In some embodiments, quorum control creation request 360 (or update request 362), may select or specify cumulative risk-based scoring for quorum authorization as one of a multiple supported authorization policies by authorization service 210. For example, request 360 (or request 362) can specify in an approval policy whether to use denial responses (and/or non-responses) to adjust (e.g., subtract from) a total authorization score. Quorum control creation 232 may implement quorum control authorization 310, which may evaluate whether or not a requesting user has the authority to create a quorum control, in some embodiments. For example, quorum control authorization 310 may rejection quorum control creation or edit requests 360 from non-root users, in some embodiments. In some embodiments, an authorization error 312 may be sent.

Quorum control management 232 may implement policy validation 320, in some embodiments. Policy validation 320 may apply various policy validation rules to determine whether an approval policy specified for a quorum control is valid, in some embodiments. For example, a minimum number of approvers may have to be specified that is greater than 1 and less than the total number of approvers. In some embodiments, whether or not weighting schemes for votes or geographic requirements for approval may also be considered (e.g., geographic requirements may not be valid if members are not distributed geographically). For quorum control creation request that are invalid, policy validation 320 may send an error indication.

Quorum control management 232 may implement membership management 330 to handle interactions with proposed quorum members (or to propose quorum control changes). For example, as indicated at 331, membership management 330 may send quorum control membership notifications to quorum members 340. These proposals may be sent through communication channels specified in the creation request 360. Quorum members may be passive members of a quorum set, in some embodiments, receiving notifications (or in some cases not receiving notification) of quorum set membership without the opportunity to approve membership. In some embodiments, (or a subset of quorum members 340) may accept or deny the quorum control membership in responses. Membership management 330 may evaluate whether enough acceptances have been received to create/enforce the quorum control (e.g., according to an approval policy or a different quorum control approval policy, which may or may not be specified by the quorum creation control request). For example, a minimum number of acceptances may have to be obtained. In some embodiments, denial of accepting quorum membership could result in a failure of the quorum control to be created or could be a vote against the quorum control (which could still succeed if enough approval votes were received). Similar interactions and requests may be exchanged for quorum control updates. Failed updates may not be applied. Successful creation requests may be stored 337 as quorum membership data 350 and quorum policy data 352 in quorum management store 214, in some embodiments. In some embodiments, quorum membership (and creation) may not be subject to approval. For example, quorum members can be added without responding or accepting. In such scenarios, notifications of quorum membership may (or may not) be sent. Similar techniques may be implemented for quorum control update requests 362 (e.g., authorization checks at 310, validation of updates at 320, membership management notifications at 330, etc.).

Quorum control deletion requests 370 may be treated like updates or may be separately handled. For example, a quorum control deletion request (if authorized) may be sent to membership management 330, which may submit proposals and evaluate responses. In some embodiments, an authorized user for a quorum control deletion request (e.g., a root user) may delete the quorum control without quorum authorization and thus membership management 330 may submit a quorum control deletion notification 335 to quorum members 340 and may delete 339 quorum membership data 350 and quorum policy data 352 from quorum management store 214.

Figure 4:
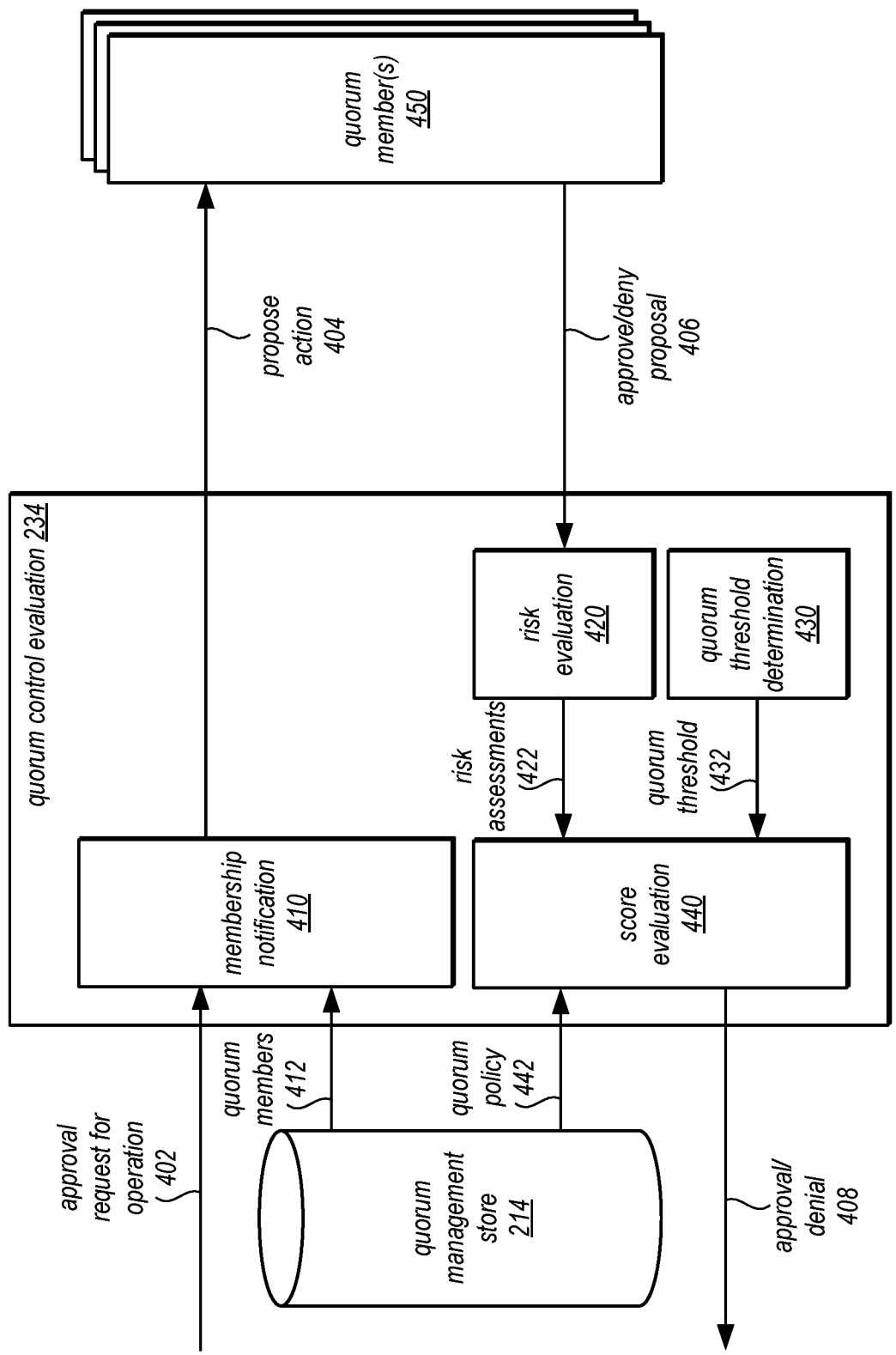
FIG. 4 illustrates example interactions to perform requests to obtain authorization using cumulative risk-based scoring for quorum authorization, according to some embodiments.

FIG. 4 illustrates example interactions to perform requests to obtain authorization using cumulative risk-based scoring for quorum authorization, according to some embodiments. Quorum control creation 232 may implement various techniques, such as the techniques discussed below with regard to FIGS. 6 and 7. Quorum control evaluation 234 may handle various requests and/or interactions to support and enforce quorum controls for proposed actions, in some embodiments. For example, quorum control evaluation 234 may implement action validation (not illustrated), in some embodiments. Action validation may receive a request for approval of an operation, as indicated at 402, and determine whether the operation is valid for quorum control. Some operations may, for instance, not be specified for handling in the policy for the quorum control and thus may be handled using a different mechanism (e.g., other automated handling techniques, human agent handling, etc.). For invalid operations, a validation error may be returned.

In various embodiments, quorum control evaluation 234 may implement membership notification 410 to handle sending notifications to quorum set members, in some embodiments. For example, membership notification 410 may get 412 quorum members for the quorum control from quorum management store 214, in some embodiments in order to obtain members. Membership notification 410 may then propose 404 the action to quorum member(s) 450. In some embodiments, a minimal number of members 450 may be tried and then a larger number of a response is not received within some retry time period. In some embodiments, all members 450 may be sent proposals. Membership notification 410 may include information for determining whether the access control operation should be performed (e.g., identity of requesting user, operation type, operation parameters, time of request, etc.).

Quorum members 450 may approve or deny the proposal, as indicated at 406. Quorum control evaluation 234 may support various communication channels for sending proposals 404 and accepting responses 406, such as programmatic interfaces for client applications or devices operated by a user that is a quorum member to submit responses, including a web-based console, electronic message, notification, application installed or downloaded to a client, among others.

Quorum control evaluation 234 may implement risk evaluation 420, in some embodiments. Risk evaluation 420 may implement various models, rules, heuristics or other decision models for determining risk assessments of approvals and denials 406 from different quorum member(s) 450. For example, a machine learning model or rules-based decision engine may take information known or collected for quorum members (e.g.,. from another provider network service, such as an identity and access management information service or other service that monitors actions) in order to obtain the features as input parameters for risk assessment. Confidence scores or other risk values may be determined and provide as risk assessments 422 to score evaluation 440.

Figure 5A:
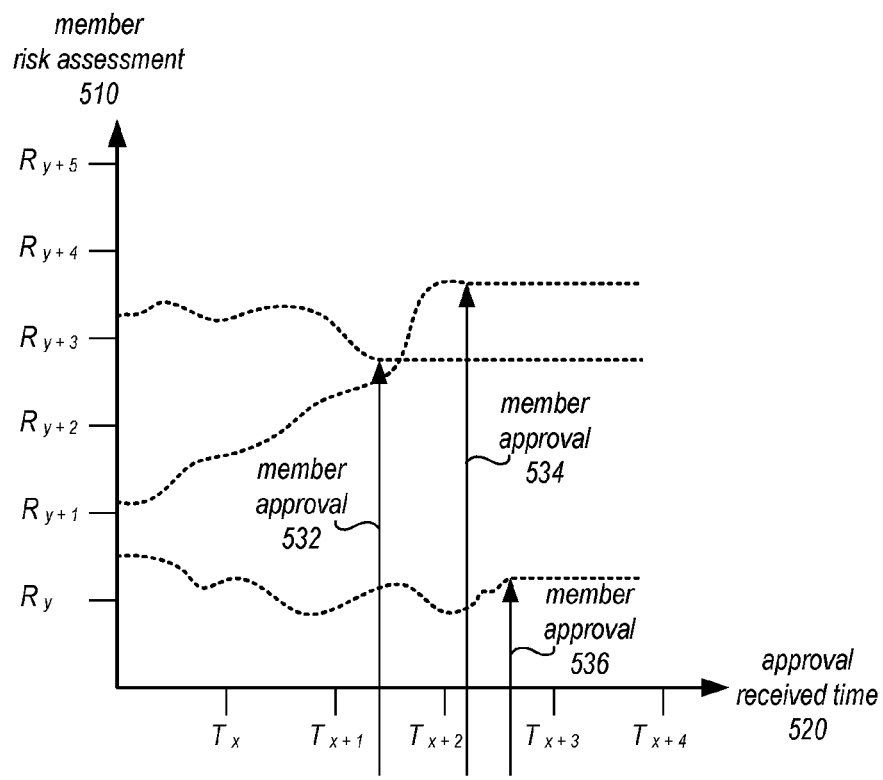
FIGS. 5A - 5B illustrate example graphs of changes to risk assessments and quorum authorization thresholds over time, according to some embodiments.

Risk assessments of members may change over time. For example, FIG. 5A illustrates member risk assessment values 510 (e.g., "R") and the various changes in risk assessment values that are (or would be) determined at different received approval times, as indicated at 520. For example, member approval 532 locks in the risk assessment for one member between time T x+1 and member approvals 534 and 536 are locked in at later times. As illustrated in FIG. 5A, risk assessments may change over time for members (e.g., due to the increasing likelihood that a member's system can be taken over or impersonated by a malicious actor).

Figure 5B:
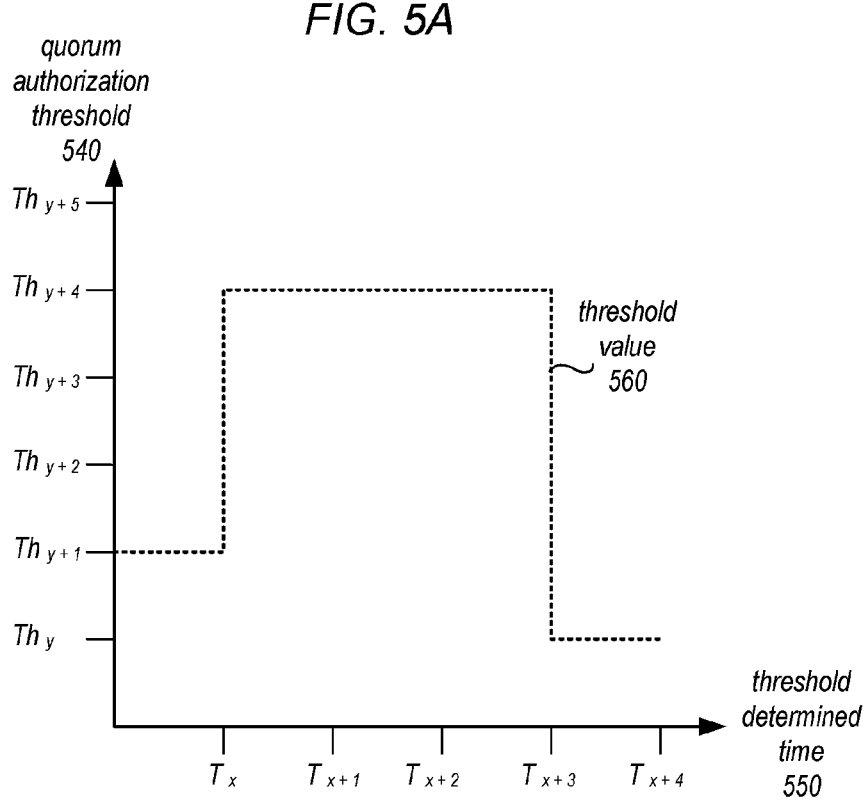

Quorum control evaluation 234 may implement quorum threshold determination 430, in some embodiments. Quorum threshold determination 430 may provide a quorum threshold 432 for score evaluation 440 to use, in some embodiments. For example, as illustrated in FIG. 5B, quorum authorization thresholds 540 may change over time at which they are determined 550. At T x, for instance, threshold value 560 increases and then at time T x+3 threshold value decreases again (to a different value). These changes may be specified by various policy or other considerations (e.g., increasing or decreasing requirements when risk of mistaken authorization is higher or lower), which quorum threshold determination 430 may apply to dynamically determine the threshold. In some embodiments, static quorum approval thresholds 432 may be provided (e.g., which may be statically defined for all or different types of requests).

Quorum control evaluation 234 may implement score evaluation 440, which may utilize policy information 442 obtained from quorum management store 214 to determine based on the responses whether the proposed action should be approved or denied according to the total authorization score determined from individual authorization scores based on risk assessments 422 and the quorum threshold 432. Score evaluation 440 may also implement other criteria (e.g., minimum numbers of approvers and/or timeouts as discussed below with regard to FIG. 7), in some embodiments. Approval or denial 408 may be sent in response to approval request 402. In some embodiments, approval management 420 may update auditing and/or monitoring services 240 with information about the request, approval process (e.g., approved, denied, by which quorum members, etc.).

Although FIGS. 2 - 5B have been described and illustrated in the context of an authorization service, the various techniques and components illustrated and described in FIGS. 2 - 5B may be easily applied to other authorization systems in different embodiments for one or multiple different systems or services, which may be public or private. As such, FIGS. 2 - 5B are not intended to be limiting as to other embodiments of a system that may implement cumulative risk-based scoring for quorum authorization.

Various different systems and devices may implement the various methods and techniques described below, either singly or working together. For example, an identity and access management service such as described above with regard to FIGS. 2 - 5B may be configured to implement the various methods. Therefore, the above examples and or any other systems or devices referenced as performing the illustrated method, are not intended to be limiting as to other different components, modules, systems, or configurations of systems and devices.

Figure 6:
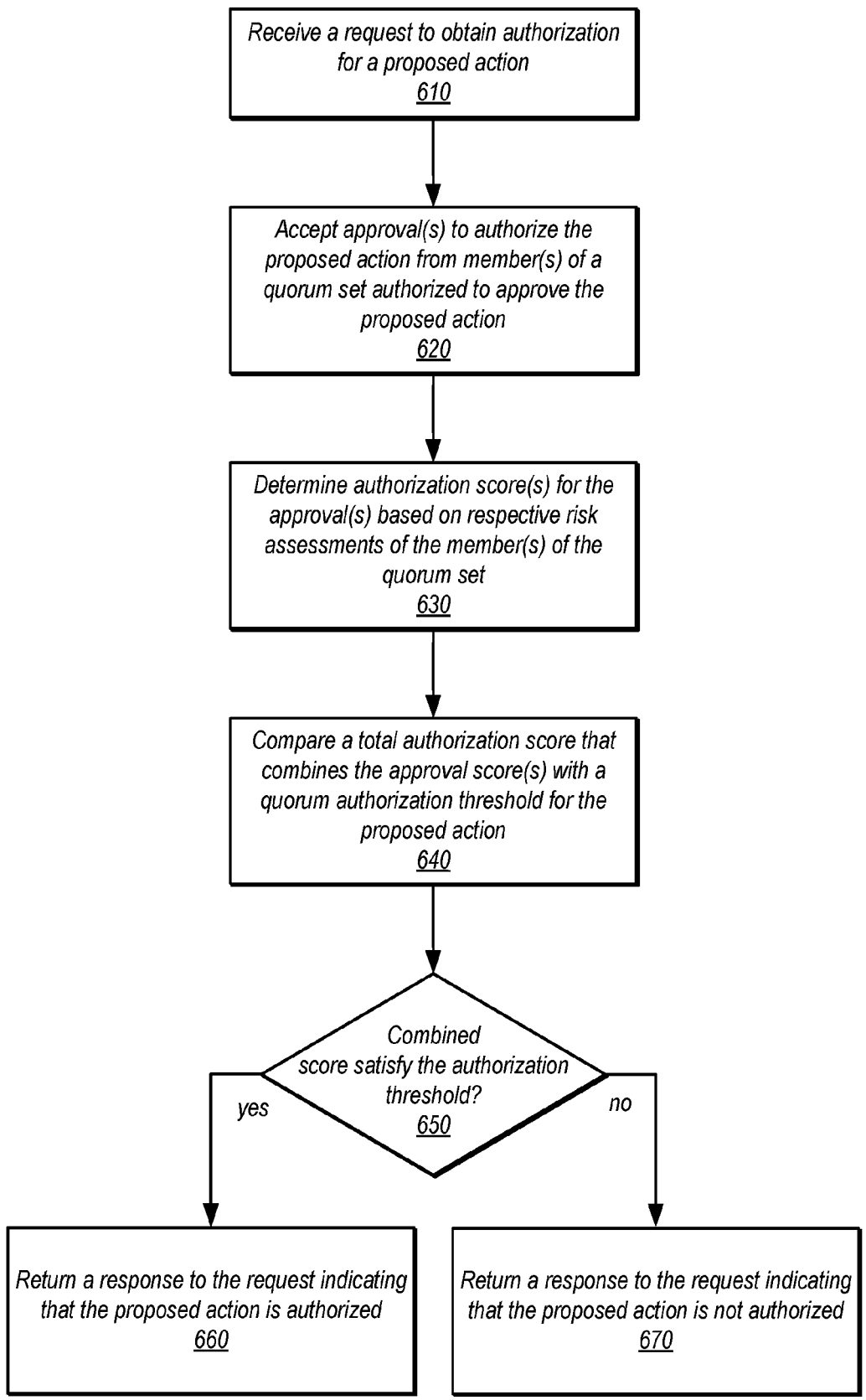
FIG. 6 is a high-level flowchart illustrating various methods and techniques to implement cumulative risk-based scoring for quorum authorization, according to some embodiments.

FIG. 6 is a high-level flowchart illustrating various methods and techniques to implement cumulative risk-based scoring for quorum authorization, according to some embodiments. As indicated at 610, a request may be received to obtain authorization for a proposed action, in some embodiments. For example, the request may be formatted or received according to various types of interfaces, such as a programmatic interface like an API, a GUI, command line, and/or other type of interface. The request may, in some embodiments, identify the quorum set along with the proposed action. In some embodiments, the proposed action may include resources, users, accounts, operations, credentials, or other information that may be used to identify quorum set members and/or provide quorums set members with the information to determine whether to grant or deny authorization.

As indicated at 620, approval(s) may be accepted to authorize the proposed action from member(s) of a quorum set authorized to approve the proposed action, in some embodiments. For example, quorum set members may be identified (e.g., by user name or other identifier) and compared with quorum set membership information to verify membership and identity. In some embodiments, an authorization system may perform notifications to quorum set members, whereas in other embodiments, a different system may provide notifications to quorum set members and the authorization system may support different paths for accepting responses, including approval(s) and denials.

As indicated at 630, authorization score(s) for the approval(s) may be determined based on respective risk assessments of the member(s) of the quorum set, in some embodiments. For example, as discussed above, a machine learning model may take different features identified, extracted or otherwise obtained for the different approvers and run a classification model to determine a confidence score that indicates the member is a risky or not risky approver. These scores may be combined with other scores or weights for approvers (e.g., as may be defined in a validation policy), in some embodiments. In some embodiments, these confidence scores for risk may be the authorization score(s). In some embodiments, as noted above the confidence scores for risk may be a current value determined for the member at the time the approval was received. In other embodiments, the confidence scores for risk may be determined when the total authorization score is compared with the quorum authorization threshold (e.g., and thus an approver's influence may change over time as the respective risk of that approver changes).

As indicated at 630, a total authorization score that combines the authorization score(s) may be compared with a quorum authorization threshold for the proposed action. In some embodiments, only approval responses may be considered (e.g., non-responses or denials may be ignored). In other responses, denial responses may also affect the total authorization score (e.g., by subtracting a confidence score for risk for the member from the combined authorization scores). The quorum authorization threshold may be dynamically determined, as discussed above with regard to FIG. 4 and below with regard to FIG. 7, in some embodiments. In this way, authorization thresholds may be satisfied at one time and not at another (or vice versa).

As indicated by the positive exit from 650, if the total authorization score satisfies the authorization threshold, then a response may be returned to the request indicating that the proposed action is authorized, in some embodiments. As indicated by the negative exit from 650, if the total authorization score does not satisfy the authorization threshold, then a response may be returned to the request indicating that the proposed action is not authorized, in some embodiments.

Figure 7:
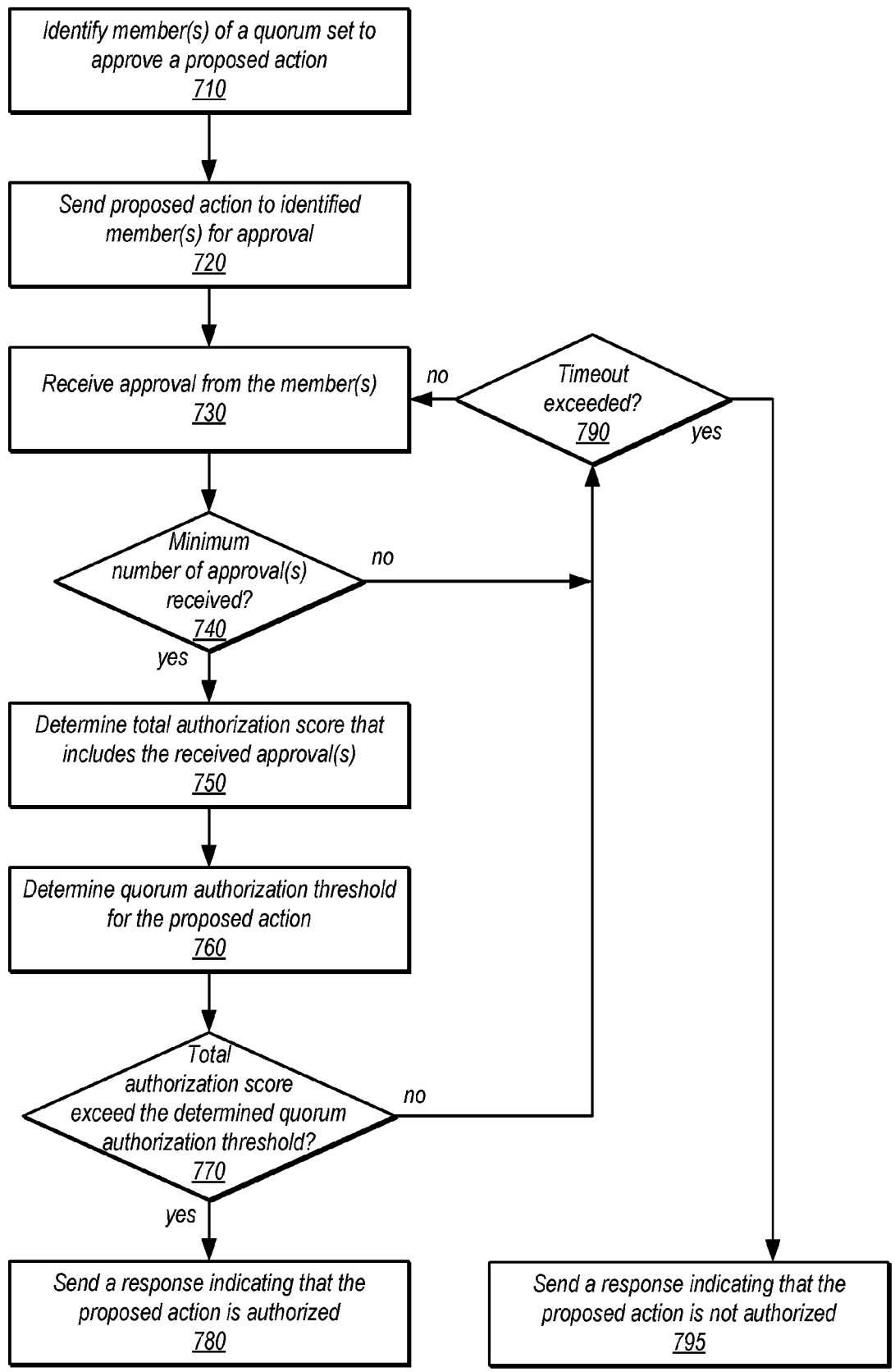
FIG. 7 is a high-level flowchart illustrating various methods and techniques to implement handling for requests to obtain authorization using cumulative risk-based scoring for quorum authorization, according to some embodiments.

Various other features (e.g., specified in a policy creation or update request) may add further features to how authorization requests are handled, in various embodiments. FIG. 7 is a high-level flowchart illustrating various methods and techniques to implement handling for requests to obtain authorization using cumulative risk-based scoring for quorum authorization, according to some embodiments. As indicated at 710, member(s) of a quorum set may be identified to approve a proposed action, in some embodiments. For example, a quorum membership list or other information (e.g., indicating notification methods) may be accessed. In some embodiments, as indicated at 720, proposed action notifications may be sent to the identified members for approval. For example, communication paths may be specified for individual members, in some embodiments.

As indicated at 730, approval may be received from the member(s), in some embodiments. For example, an interface to a voting or other approve/deny selection for a provided proposed action may be implemented and used to receive the approval from the members(s). As noted earlier, different features or criteria may be considered in addition to risk-based scores. For example, as indicated at 740, a minimum number of approval(s) may have to be received (e.g., more than 3 approvals even if the 3 approval provide a total authorization score that satisfies the quorum authorization threshold). If a minimum number is not received then an authorization system may wait until the minimum number is received before checking the total authorization score.

In some embodiments, a timeout feature may be implemented to limit the amount of time a proposed action can remain outstanding. For example, as indicated at 790, if the minimum number of approvers is not received, then a check may be made as to whether a timeout has been exceeded (e.g., a waiting time exceeds a time threshold for the proposed action). If exceeded, then as indicated at 795, a response may be sent indicating that the proposed action is not authorized, in some embodiments. If not exceeded, then further opportunity to receive approval may be provided.

When a minimum number of approvals are received, then a total authorization score that includes the received approval(s) may be determined, as indicated at 750, in some embodiments. For example, sum total may be updated to add the new authorization scores generated from risk assessments determined for the new approvals (e.g., using techniques discussed above with regard to FIGS. 1 and 6). As noted above with regard FIG. 5, the risk assessments of the approvals may be received when the approval is received, at some embodiments, so that the value of two equal approvals received at different times could actually have different authorization scores from different risk assessments.

As indicated at 760, the quorum authorization threshold for the proposed action may be determined, in some embodiments. For example, the quorum authorization threshold may change or be dynamically determined according to rules and/or conditions for the authorization threshold (e.g., specified in a policy for the quorum set). Different times of day, volumes of request, types of request, or other differences may be used or mapped to different quorum authorization thresholds. In this way, quorum authorization threshold may be satisfied at one time for a proposed action and not at another time using the same received authorizations, in some embodiments. For example, as discussed below with regard to FIG. 8, different techniques for handling a change to quorum authorization threshold may be implemented for pending authorization requests.

As indicated at 770, a determination may be made as to whether the total authorization score exceeds the determined quorum authorization threshold, in some embodiments. If not, assessment may continue if timeout is not exceeded (as indicated at 790). If yes, then as indicated at 780, a response indicating that the proposed action is authorized may be received, in some embodiments.

Figure 8:
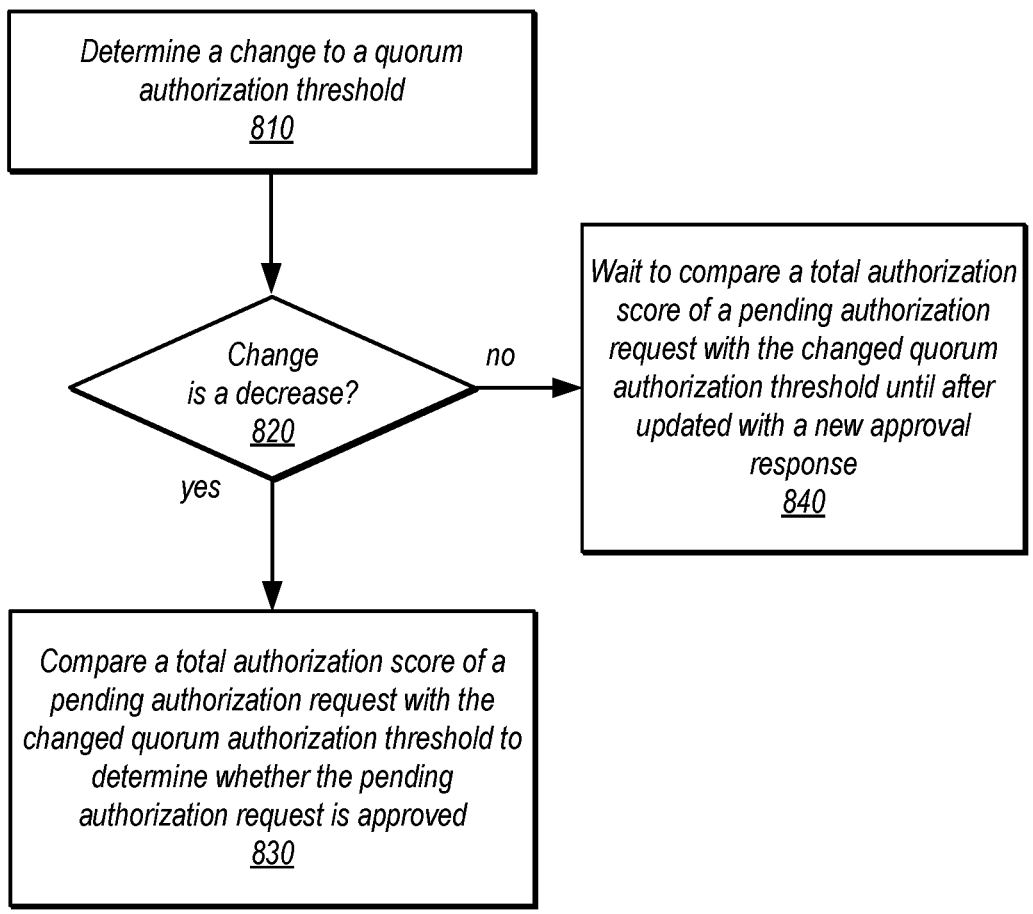
FIG. 8 is a high-level flowchart illustrating various methods and techniques to implement handling for requests to obtain authorization using cumulative risk-based scoring for quorum authorization, according to some embodiments.

FIG. 8 is a high-level flowchart illustrating various methods and techniques to implement handling for changing quorum authorization thresholds, according to some embodiments. For example, as indicated at 810, a change to a quorum authorization threshold may be determined (e.g., corresponding to a change in time, workload, or various other factors). The effect of the change to the quorum authorization threshold may be considered, in some embodiments. For example, if the change is a decrease, as indicated by the positive exit from 820, then a total authorization score of a pending authorization request may be compared with the changed quorum authorization threshold to determine whether the pending authorization request is approved, in some embodiments, as indicated at 830. In this way, changes to quorum authorization thresholds that would allow for pending requests to be authorized may be dynamically checked corresponding to the dynamic changes to quorum authorization.

In some embodiments, if the change is not a decrease (e.g., an increase), as indicated by the negative exit from 820, then an authorization system may wait to compare the total authorization score of a pending authorization request with the changed quorum authorization threshold until after updated with a new approval response, in some embodiments, as indicated at 840. In this way, pending requests that have not yet satisfied a lower quorum authorization threshold are not reevaluated when it was previously determined that the pending requests did not satisfy the lower threshold. In some embodiments (not illustrated), all changes to quorum authorization thresholds may trigger reevaluations of pending authorization requests.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
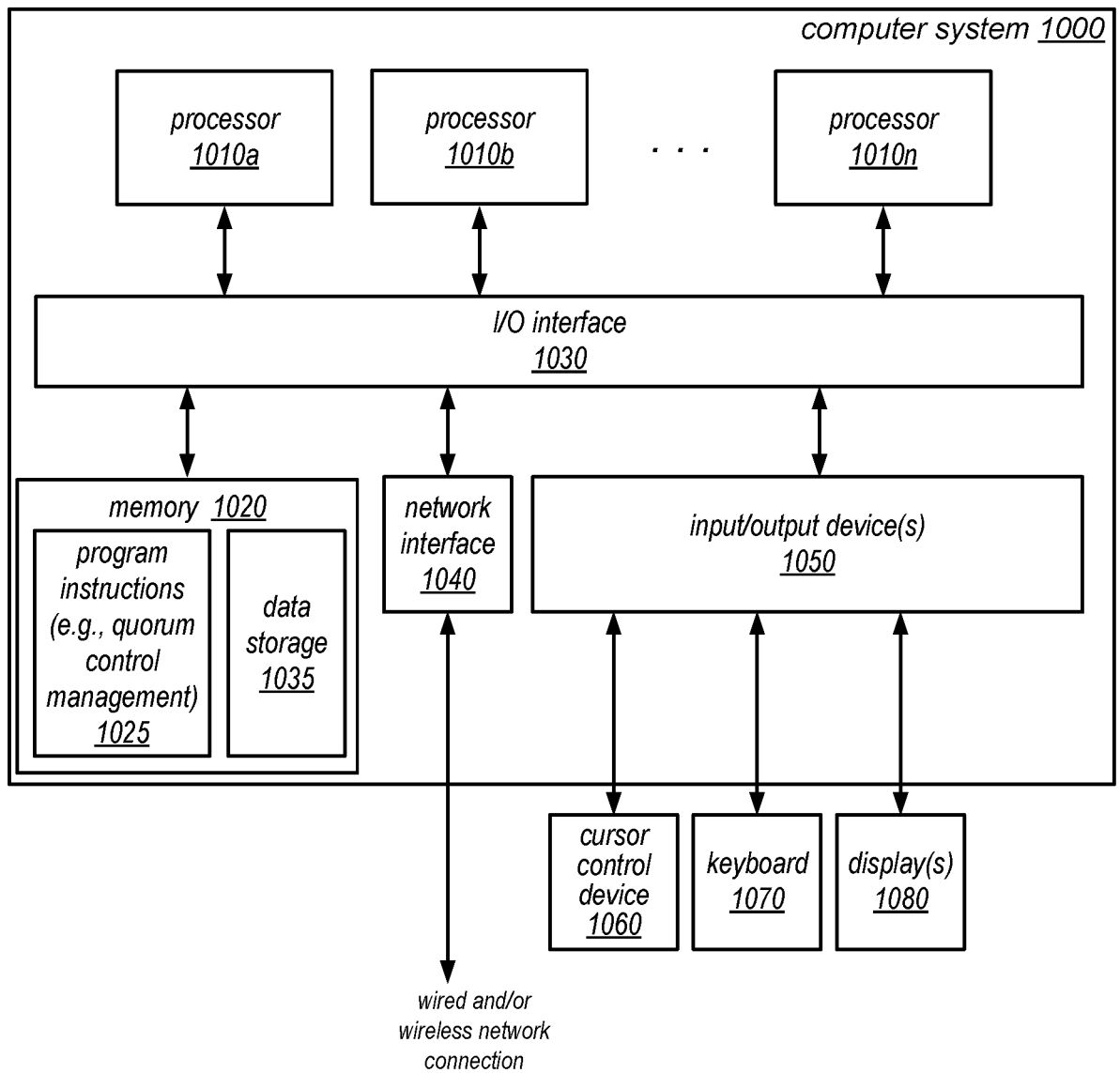
FIG. 9 illustrates an example system configured to implement the various methods, techniques, and systems described herein, according to some embodiments.

Embodiments of cumulative risk-based scoring for quorum authorization as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multitouch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., quorum control management, quorum control creation, authorization systems, services or other systems that implement cumulative risk-based scoring for quorum authorization) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system of a provider network, the system comprising:
at least one processor; and
a memory, storing program instructions that when executed by the at least one processor, cause the at least one processor to implement an authorization system, configured to:
receive a request via an interface of the authorization system to obtain authorization for a proposed action;
identify a quorum set comprising a plurality of quorum members, wherein the quorum set is authorized to approve the proposed action;
send one or more notifications to at least some quorum members of the quorum set indicating the proposed action for approval;
receive, via the interface, one or more approvals from one or more quorum members of the quorum set authorizing the proposed action;
perform respective risk assessments of mistaken authorization to approve the proposed action for individual ones of the one or more quorum members of the quorum set that sent the one or more approvals to determine respective authorization scores for individual ones of the one or more approvals;
combine the respective authorization scores determined for individual ones of the one or more approvals into a total authorization score;
compare the total authorization score with a quorum authorization threshold for the proposed action to determine that the total authorization score satisfies the quorum authorization threshold; and
return a response to the request via the interface indicating that the proposed action is authorized.

2. The system of claim 1, wherein the authorization system is further configured to:
determine the quorum authorization threshold to be compared with the total authorization score, wherein the determination changes from a prior value of the quorum authorization threshold to a new value for the quorum authorization threshold.

3. The system of claim 1, wherein the authorization system is further configured to:
return a response to another request via the interface indicating that another proposed action is not authorized after a determination that the quorum authorization threshold is not satisfied based on one or more approvals received for the other proposed action.

4. The system of claim 1, wherein the authorization system is implemented as part of an identity and access management service offered by a provider network and wherein the request to obtain authorization is received from another service offered by the provider network.

5. A method, comprising:
responsive to a request received via an interface to obtain authorization for a proposed action:
accepting, via the interface, one or more approvals from one or more quorum members of a quorum set authorizing the proposed action, wherein the quorum set is authorized to approve the proposed action;
determining respective authorization scores for individual ones of the one or more approvals based, at least in part, on respective risk assessments of mistaken authorization to approve the proposed action for individual ones of the one or more quorum members of the quorum set that sent the one or more approvals;
comparing a total authorization score that combines the respective authorization scores determined for individual ones of the one or more approvals with a quorum authorization threshold for the proposed action to determine that the total authorization score satisfies the quorum authorization threshold; and
returning a response to the request via the interface indicating that the proposed action is authorized.

6. The method of claim 5 further comprising:
returning a response to another request via the interface indicating that another proposed action is not authorized after a determination that the quorum authorization threshold is not satisfied based on one or more approvals received for the other proposed action.

7. The method of claim 5, wherein a policy for the quorum specifies whether denials or non-responses are used to determine the total authorization score, wherein a denial is received from a quorum member of the quorum set, and wherein the method further comprises subtracting an authorization score for the denial from the total authorization score before comparing the total authorization score with the quorum authorization threshold.

8. The method of claim 5, wherein the one or more approvals are received at different times and wherein the respective authorization scores for the one or more approvals are determined at the different times.

9. The method of claim 5, further comprising sending respective notifications of the proposed action to different quorum members of the quorum set.

10. The method of claim 5, further comprising determining that a number of the one or more approvals satisfies a minimum number of approvals for the quorum set before comparing the total authorization score with the quorum authorization threshold.

11. The method of claim 10, wherein the minimum number of approvals for the quorum set was specified in a request to create the quorum set to authorize the proposed action.

12. The method of claim 5, further comprising determining the quorum authorization threshold to be compared with the total authorization score, wherein the determining changes from a prior value of the quorum authorization threshold to a new value for the quorum authorization threshold.

13. The method of claim 12, wherein the comparing the total authorization score of the respective authorization scores with the quorum authorization threshold for the proposed action is performed after determining that the change to the new value of the quorum authorization threshold is a decrease.

14. One or more non-transitory, computer-readable storage media, storing program instructions that when executed on or across one or more computing devices cause the one or more computing devices to implement:
receiving a request via an interface of an authorization system to obtain authorization for a proposed action;

receiving, via the interface, one or more approvals from one or more quorum members of a quorum set authorizing the proposed action, wherein the quorum set is authorized to approve the proposed action;

determining respective authorization scores for individual ones of the one or more approvals based, at least in part, on respective risk assessments of mistaken authorization to approve the proposed action for individual ones of the one or more quorum members of the quorum set that sent the one or more approvals;

combining the respective authorization scores determined for individual ones of the one or more approvals into a total authorization score;

comparing the total authorization score with a quorum authorization threshold for the proposed action to determine that the total authorization score satisfies the quorum authorization threshold; and returning a response to the request via the interface indicating that the proposed action is authorized.

15. The one or more non-transitory, computer-readable storage media of claim 14, storing further instructions that when executed by the one or more computing devices cause the one or more computing devices to further implement determining the quorum authorization threshold to be compared with the total authorization score, wherein the determining changes from a prior value of the quorum authorization threshold to a new value for the quorum authorization threshold.

16. The one or more non-transitory, computer-readable storage media of claim 15, wherein the comparing the total authorization score of the respective authorization scores with the quorum authorization threshold for the proposed action is performed after determining that the change to the new value of the quorum authorization threshold is a decrease.

17. The one or more non-transitory, computer-readable storage media of claim 14, storing further instructions that when executed by the one or more computing devices cause the one or more computing devices to further implement:

creating the quorum set authorized to approve the proposed action responsive to a request to create the quorum set that specifies risk-based evaluation for determining quorum authorization.

18. The one or more non-transitory, computer-readable storage media of claim 14, storing further instructions that when executed by the one or more computing devices cause the one or more computing devices to further implement:

returning a response to another request via the interface indicating that another proposed action is not authorized after a determination that the quorum authorization threshold is not satisfied when a timeout for determining authorization for the other request is exceeded.

19. The one or more non-transitory, computer-readable storage media of claim 14, storing further instructions that when executed by the one or more computing devices cause the one or more computing devices to further implement determining that a number of the one or more approvals satisfies a minimum number of approvals for the quorum set before comparing the total authorization score with the quorum authorization threshold.

20. The one or more non-transitory, computer-readable storage media of claim 14, wherein the authorization system is implemented as part of an authorization service offered by a provider network and wherein the request to obtain authorization is received from another service offered by the provider network.

* * * * *